Patented Feb. 6, 1923.

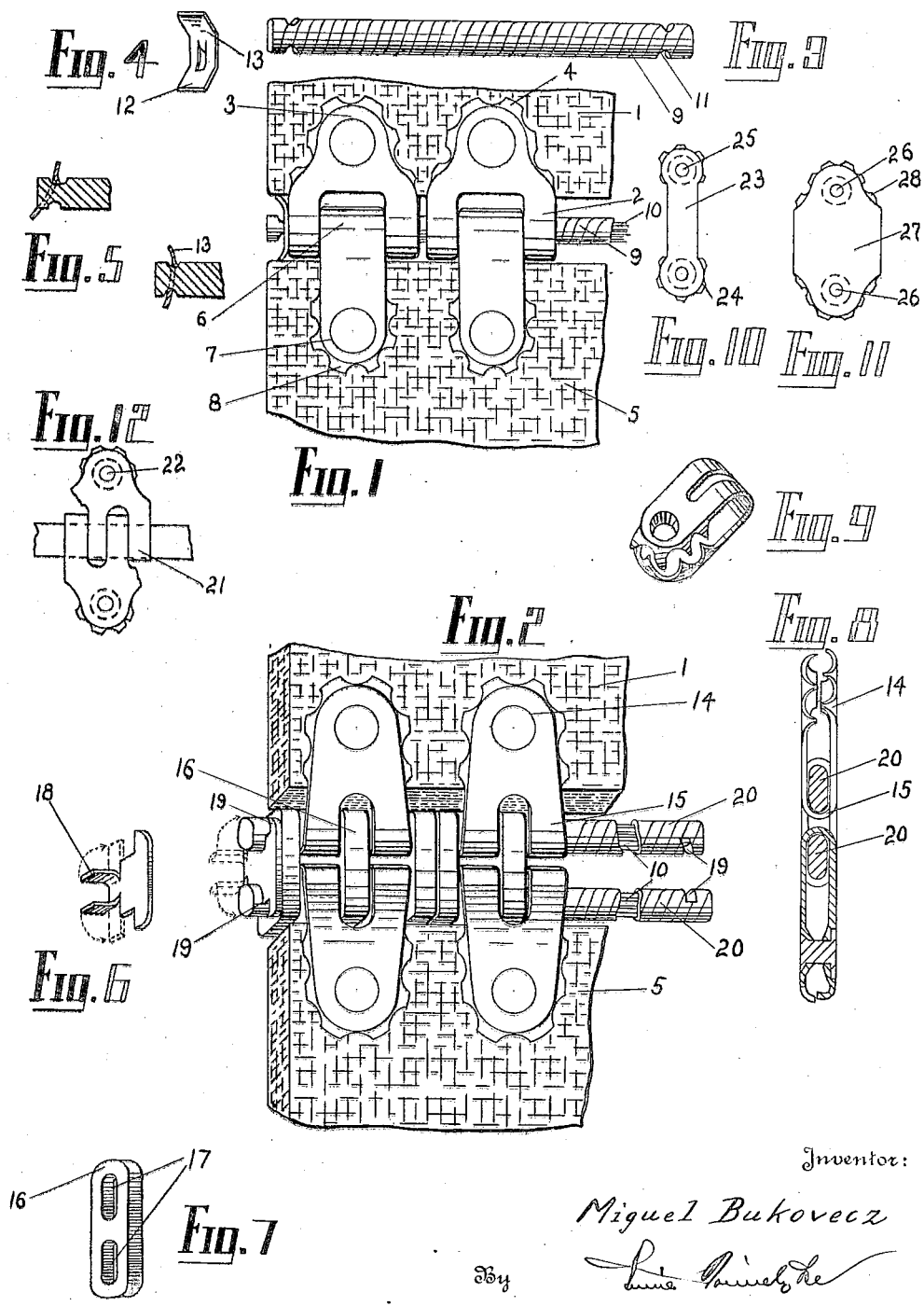

1,444,301

UNITED STATES PATENT OFFICE.

MIGUEL BUKOVECZ, OF MEXICO, MEXICO.

BELT FASTENER.

Application filed August 2, 1920. Serial No. 400,798.

*To all whom it may concern:*

Be it known that I, MIGUEL BUKOVECZ, citizen of Yugoslavia, residing at Mexico City, Federal District, Mexico, have invented certain new and useful Improvements in Belt Fasteners, of which the following is a specification.

This invention refers to belt fasteners or riveted and hinged clasps to unite the two ends of a conveyor or transmission belt, and I especially mention among the principal objects of this invention, the construction of a clasp which will have considerable strength as required for wide belts, and in such a manner that the joining of the two ends of the belt will have both faces smooth, and when the belt is provided with the necessary number of hooks or clasps according to the width of the belt, the union will have the transversal flexibility of the belt, necessary to adapt itself to the pulleys over which it passes.

In all of the known systems up to the present where riveted clasps have been used, in practice their defects have been discovered to the effect that they cannot resist the great tension, and that the belts tear or cut at the union.

On the other hand, systems which have sufficient resistance are subject to the defect of the clasps being too heavy, the union is not flexible, and in addition is so thick that it projects too much above the surface of the belt, for which reason they are not adaptable in many places, being dangerous to persons coming near the belt when in motion; also there are other secondary objections which I deem to have overcome with my clasps, the characteristic of the clasps being that they are provided with teeth, which from both sides are introduced into the faces of the belt and held together by rivets.

Being thus joined and braced in this manner, the weakness caused by the perforations in the belt ends for the rivets is compensated, while the area of the clinch with the belt is increased to resist great tension and without destroying the fiber.

The clasps are united with a rivet on a hinge pin or upon two parallel hinge pins, in which case union links should be employed.

The hinge pin is oval shaped and flexible, composed of a combination of metal threads wound with a metal tape.

With reference to the drawing:

Fig. 1 is a plan view of a fraction of two ends of the belt with clamps applied.

Fig. 2 is a perspective view of a fraction of two ends of the belt having modified clamps applied thereto and cooperating union links.

Fig. 3 is a plan view of a flexible hinge pin.

Fig. 4 is a perspective view of a stop plate.

Fig. 5 shows cross-sectional views showing the method of securing the plates to the rod.

Fig. 6 is a perspective view of a stop plate for the modification shown in Fig. 2.

Fig. 7 is a perspective view of a link.

Fig. 8 is a cross-sectional view showing the coupling as shown in the modification in Fig. 2.

Fig. 9 is a perspective view of a coupling member as shown in the modification in Fig. 2.

Figs. 10 and 11 are plan views showing the clamping links.

Fig. 12 is a plan view of a modified form of clamping link.

(1) shows the belt provided with female clasps which comprise two bent and spaced parts (2) and the perforated ends (3) the edges of which are bent at right angles forming teeth (4). The opposite end (5) of the belt is provided with male clasps, made up of the bent parts (6), arranged to occupy the space between the bent parts (2) of the female clasps, the edges of the ends (7) of the perforated male clasps being bent and forming teeth (8). As shown in Fig. 1 the male and female clasps are joined by a hinge pin, made up of a number of metal threads (10) covered by a tape (9) and being flat or oval in cross section in order to give it greater resistance in the line of greater diameter, and on the other hand affords transversal flexibility to the belt, which allows the union to adapt itself to the configuration of crowned transmission pulleys. The ends of the hinge pin carry two grooves (11) whose surfaces may be smoothed with solder, and in which are adjusted stop plates (12) provided with a center tongue (13), bent backwards, which will permit the insertion of the plate at the end of the pin to adjust in the grooves (11).

In Fig. 2 is shown a modification of the female clasps in this case comprising the indented perforated ends (14) spaced bent parts (15) between which will fit the link (16) provided with double perforations (17), the hinge pin (20) passing through the clasps and links, and employing in this case, where two hinge pins are used, the retainer plates shown in the form of an H, whose first vertical stroke (18) is bent as shown in the drawing, to facilitate the introduction of the retainer in the grooves (19) of the hinge pin (20), similar to the pin (9) with the exception that its grooves are not double but single. As will be seen the links (16) are used as spacers between the clasps.

In Fig. 3 has been shown a modification of the female clasps which in this case are of an irregular form, which will allow the mutual interlocking of its bent parts (21), said bent parts joining in the cut-out of the opposite clasp, the perforations (22) of the clasps still maintaining themselves aligned when the rivets are introduced and the clasps are joined.

In Fig. 4 I have shown still another modification which consists of the lower clamping links (23) provided at each end with teeth (24) and perforations (25), which coincide with the perforations (26) of the upper clamping links (27), which have teeth (28) at the ends, introducing as in previous cases a rivet in each end of the clamping links.

Having thus described my invention what I claim is:

1. A belt end fastener comprising a U-shaped clip adapted to embrace one end of the belt and having on each of the legs of the U inwardly bent prongs to pierce the belt, and alined apertures in close proximity to the prongs to receive a rivet by means of which the legs are held in close contact with the belt with the prongs piercing the same, said clip having a central cut-out portion adjacent the bight of the U; means connected to the other end of the belt extending into said cut-out portion; a coupling rod passing through said means and said clip and engaged in the bight of the U; and a deformable plate for holding the coupling rod in position.

2. A belt end fastening device comprising a pair of U-shaped clips each adapted to embrace one of the adjacent ends of a belt, each clip having on each of the legs around the entire edge of the U inwardly bent prongs to pierce the belt and alined apertures in close proximity to the prongs to receive a rivet by means of which the legs are held in close contact with the belt with the prongs piercing the same; and means comprising a flexible coupling rod for interconnecting said clips; and means comprising plates for securing said rod in said clips.

3. A belt end fastening device comprising a pair of U-shaped clips each adapted to embrace one of the adjacent ends of a belt, each clip having on each of the legs of the U inwardly bent prongs to pierce the belt and alined apertures in close proximity to the prongs to receive a rivet by means of which the legs are held in close contact with the belt with the prongs piercing the same; coupling links cooperating with said clips; coupling rods one passing through one side of said links and engaging the bight of the U of the clip on one end of the belt and the other coupling rod passing through the other side of the links and engaging the bight of the U of the clip on the other end of the belt; and deformable catches for holding the coupling rods in operative position.

4. A belt end fastening device comprising a pair of U-shaped clips each adapted to embrace one of the adjacent ends of a belt, each clip having on each of the legs of the U inwardly bent prongs to pierce the belt and alined apertures in close proximity to the prongs to receive a rivet by means of which the legs are held in close contact with the belt with the prongs piercing the same; coupling links cooperating with said clips; flexible coupling rods one passing through one side of said links and engaging the bight of the U of the clip on one end of the belt and the other flexible coupling rod passing through the other side of the links and engaging the bight of the U of the clip on the other end of the belt; and deformable plates for holding the flexible coupling rods in operative position.

5. A belt end fastener comprising a clip adapted to embrace one end of the belt and having prongs to pierce the belt, means for holding the clip in close contact with the belt with the prongs piercing the same, means connected to the other end of the belt and engaged with the clip, and a flexible coupling rod passing through the last named means and said clip, said rod being composed of metal threads and wound with a metal tape.

In testimony whereof I have affixed my signature.

MIGUEL BUKOVECZ.